United States Patent
Stresewski et al.

(10) Patent No.: US 11,326,021 B2
(45) Date of Patent: May 10, 2022

(54) PRODUCING A BELLOWS

(71) Applicant: GKN DRIVELINE INTERNATIONAL GMBH, Lohmar (DE)

(72) Inventors: Thorsten Stresewski, Cologne (DE); Joachim Wette, Hennef (DE); Frank Reher, Siegburg (DE); Bernd Bender, Cologne (DE)

(73) Assignee: GKN Driveline International GmbH, Lohmar (DE)

( * ) Notice: Subject to any disclaimer, the term of this patent is extended or adjusted under 35 U.S.C. 154(b) by 0 days.

(21) Appl. No.: 16/961,730

(22) PCT Filed: Dec. 18, 2018

(86) PCT No.: PCT/EP2018/085423
§ 371 (c)(1),
(2) Date: Jul. 13, 2020

(87) PCT Pub. No.: WO2019/137753
PCT Pub. Date: Jul. 18, 2019

(65) Prior Publication Data
US 2021/0061940 A1  Mar. 4, 2021

(30) Foreign Application Priority Data

Jan. 15, 2018  (DE) .................... 10 2018 100 764.7

(51) Int. Cl.
| | | |
|---|---|---|
| C08G 63/88 | (2006.01) | |
| B29C 35/08 | (2006.01) | |
| B29D 22/02 | (2006.01) | |
| B29C 49/04 | (2006.01) | |
| B29C 49/06 | (2006.01) | |
| B29C 45/00 | (2006.01) | |
| B29C 45/02 | (2006.01) | |
| B29C 48/00 | (2019.01) | |
| C08G 63/91 | (2006.01) | |
| B29K 21/00 | (2006.01) | |
| B29K 67/00 | (2006.01) | |
| G10D 11/00 | (2006.01) | |
| B29L 31/00 | (2006.01) | |
| C08G 18/40 | (2006.01) | |
| C08G 18/42 | (2006.01) | |
| C08G 18/63 | (2006.01) | |
| C08G 18/71 | (2006.01) | |

(52) U.S. Cl.
CPC .......... *C08G 63/88* (2013.01); *B29C 35/0866* (2013.01); *B29C 45/00* (2013.01); *B29C 45/02* (2013.01); *B29C 48/00* (2019.02); *B29C 49/04* (2013.01); *B29C 49/06* (2013.01); *B29D 22/023* (2013.01); *C08G 18/4072* (2013.01); *C08G 18/4202* (2013.01); *C08G 18/4213* (2013.01); *C08G 18/4247* (2013.01); *C08G 18/631* (2013.01); *C08G 18/71* (2013.01); *C08G 63/91* (2013.01); *B29C 2035/085* (2013.01); *B29C 2035/0877* (2013.01); *B29K 2021/003* (2013.01); *B29K 2067/003* (2013.01); *B29K 2067/006* (2013.01); *B29L 2031/703* (2013.01); *G10D 11/00* (2013.01)

(58) Field of Classification Search
CPC ................ C08G 18/71; C08G 18/4072; C08G 18/4202; C08G 18/4213; C08G 18/4247; C08G 18/631; C08G 63/88; C08G 63/91; B29C 35/0866; B29C 2035/0877; B29C 2035/085; B29C 49/06; B29C 49/04; B29C 45/00; B29C 48/00; B29C 45/02; B29D 22/023; B29K 2021/003; B29K 2067/003; B29K 2067/006; G10D 11/00; B29L 2031/703
See application file for complete search history.

(56) References Cited

U.S. PATENT DOCUMENTS

| | | | | |
|---|---|---|---|---|
| 6,426,033 B1 * | 7/2002 | Wette | ...................... | F16D 3/845 |
| | | | | 264/459 |
| 6,994,913 B1 * | 2/2006 | Niki | ......................... | A43B 1/14 |
| | | | | 428/480 |
| 2011/0277867 A1 | 11/2011 | Katayama | | |

(Continued)

FOREIGN PATENT DOCUMENTS

| | | |
|---|---|---|
| CN | 102532812 A | 7/2012 |
| DE | 69732121 T2 | 12/2005 |

(Continued)

OTHER PUBLICATIONS

International Search Report and Written Opinion for PCT/EP2018/085423 dated Apr. 2, 2019 (12 pages; with English translation).

*Primary Examiner* — Rabon A Sergent

(74) *Attorney, Agent, or Firm* — Bejin Bieneman PLC

(57) ABSTRACT

Bellows, for example, a roll bellows and a folding bellows, can be produced that can be used at higher temperatures such as those prevailing in modern articulated constructions, using a mixture comprising at least one thermoplastic elastomer selected from the group of copolysters with a hard segment and a soft segment, wherein in a first step the at least one thermoplastic elastomer is mixed with approximately 0.8 wt. % to approximately 5 wt. % triallyl isocyanurate, based on the total amount of the mixture; in a second step the bellows is produced; and in a third step, the bellows is exposed to an ionizing irradiation in a range from approximately 140 kGy to approximately 350 kGy.

18 Claims, 2 Drawing Sheets

(56) References Cited

U.S. PATENT DOCUMENTS

2015/0041839 A1 2/2015 Sakai
2016/0331073 A1 11/2016 Nakano

FOREIGN PATENT DOCUMENTS

| DE | 102006017346 A1 | 10/2007 | |
|----|----|----|----|
| DE | 102006032751 A1 | 1/2008 | |
| DE | 112006003257 A5 | 10/2008 | |
| EP | 1295698 A1 | 3/2003 | |
| JP | 2003347106 A | 12/2003 | |
| JP | 20100106077 A | 5/2010 | |
| JP | 2011226616 A | 11/2011 | |
| WO | 9838435 A1 | 9/1998 | |
| WO | WO-2007079780 A1 * | 7/2007 | ......... B29C 35/0866 |
| WO | 9220731 A1 | 10/2007 | |

* cited by examiner

PRODUCING A BELLOWS

CROSS-REFERENCE TO RELATED APPLICATIONS

This application is a national stage of, and claims priority to, Patent Cooperation Treaty Application No. PCT/EP2018/085423, filed on Dec. 18, 2018, which application claims priority to German Application No. DE 10 2018 100 764.7, filed on Jan. 15, 2018, which applications are hereby incorporated herein by reference in their entireties.

BACKGROUND

Bellows, in particular arch bellows and accordion bellows, are used for sealing components. These are used in particular for sealing joints in automotive engineering. These bellows have a first collar with a large diameter, for attaching to a component, e.g., a joint component in a swivel joint, and a second collar that normally has a smaller diameter, for attachment to another component, e.g. a shaft. There is a bellows section between the first, larger collar and the second collar, which in the case of an arch bellows has a half-torus shape, and in the case of an accordion bellows is conical, and contains an accordion-like pleated region. The pleated region can also have pleats of equal diameters, and is therefore more cylindrical, at least in part. Arch bellows are used in particular in joints that allow for a large bending angle and displacement at high rotational rates. Accordion bellows are used in particular with universal joints. In the operating state, in particular at high rotational rates and greater bending angles, heat is generated in the bellows, compromising the mechanical integrity of the bellows material. In particular, the tensile strength and rotational properties of the bellows are compromised at high temperatures. In particular for advanced joint constructions that have been developed in the electrical mobilization of the automotive industry, which are subject to associated high rotational rates, the demands on these bellows have increased. Particularly with longer runtimes and higher rotational rates, the temperatures occurring during operation are significantly higher, resulting in material damages.

WO 98/38435 A1 attempts to solve the problem for an arch bellows in that it is produced in an injection molding or blow molding process from a thermoplastic elastomer, which is irreversibly cross-linked to an extent between 15% and 85%. The irreversible cross-linking can be obtained through chemical or thermal processes, or through irradiation of the finished arch bellows with β- or γ-rays. Arch bellows can be successfully produced with the method described in WO 98/38435 A1 that can withstand temperatures of up to 100° C. in continuous operation, with peak temperatures of up to 120° C., without compromising the material properties, or the tensile strength and stretching properties of the arch bellows. With regard to modern, advanced joint constructions, in particular for electric motors with higher rotational rates, the method described therein, or the arch bellows produced therewith, is not sufficiently heat resistant.

An alternative solution is disclosed in DE 11 2006 003 257 B4, which proposes a method for producing bellows from a thermoplastic elastomer material, wherein the material is irreversibly, at least partially cross-linked to shape the bellows, wherein the irreversibly cross-linked material is mixed with a starting material for the shaping, and the mixture contains a maximum of 70% of the irreversibly cross-linked material by weight. The irreversible cross-linking of the thermoplastic elastomer material prior to shaping the bellows should advantageously ensure that the accordion bellows produced from the material treated in this manner are uniform in terms of their properties, in particular with mass production. The disadvantages occurring with a subsequent cross-linking, such as is known from WO 98/38435 A1, are to be prevented by this means. The cross-linking is obtained chemically and/or thermally, and/or through irradiation. The radiation is at least approx. 0.5 MeV. However, bellows that meet the requirements for modern joint constructions and the high temperatures that occur in particular at high rotational rates, cannot be produced with the method disclosed in DE 11 2006 003 257 B4.

SUMMARY

The present disclosure relates to producing a bellows from a mixture comprising at least one thermoplastic elastomer, and a bellows produced with this method.

The bellows advantageously can withstand very high operating temperatures. Producing a bellows from a mixture comprising at least one thermoplastic elastomer as disclosed herein, provides a bellows that can withstand high temperatures, which can be used in particular in modern joint constructions and have a longer service life.

Disclosed is a method for producing a bellows from a mixture comprising at least one thermoplastic elastomer, selected from the group of copolyesters that have a hard segment and a soft segment, wherein the at least one thermoplastic elastomer is mixed in a first step with approx. (approximately) 0.8%, preferably with approx. 1.2% to approx. 5%, more preferably with approx. 1.4% to approx. 3.5%, more preferably to approx. 3%, and even more preferably with approx. 1.5%, and more preferably with approx. 1.85% to approx. 2.7% triallyl isocyanurate by weight with respect to the overall quantity of the mixture; the bellows is produced in a second step; and the bellows is exposed in a third step to ionizing radiation in a dose in the range of approx. 140 kGy to approx. 350 kGy, preferably in a range of approx. 190 kGy to approx. 260 kGy, more preferably in a range of approx. 150 kGy to approx. 250 kGy, more preferably in a range of approx. 205 kGy to approx. 320 kGy, more preferably in a range of approx. 220 kGy to approx. 280 kGy, and more preferably from approx. 170 kGy to approx. 220 kGy. The process is carried out such that the bellows material made of at least one thermoplastic elastomer still has the same melting point, and thus exhibits the properties of an elastomer, after it has been exposed to ionizing radiation. In an example, triallyl isocyanurate is used in a quantity ranging from approx. 1.85% to approx. 2.6%, more preferably in a quantity ranging from approx. 2% to approx. 2.5% by weight in each case in relation to the overall quantity of the mixture. The mixture is preferably composed of a, preferably precisely one, thermoplastic elastomer and triallyl isocyanurate in the various ranges of quantities defined above, preferably in a quantity ranging from approx. 1.85% to approx. 2.6%, more preferably in a quantity ranging from approx. 2% to approx. 2.5% by weight in each case in relation to the overall quantity of the mixture. By adding the triallyl isocyanurate functioning as a chemical and/or thermal cross-linking reagent in the specified narrow percentage ranges into the overall mixture for producing the bellows, runtimes of more than 100 hours at rotational rates of, e.g. 4,800 rpm, with bending angles of 7° and at 140° C., and even runtimes of more than 500 hours at rotational rates of 6,000 rpm at bending angles of 3° can be advantageously reached, surprisingly in conjunction with the irradiation, even at temperatures of 150° C., which could not be reached without adding the triallyl isocyanurate, even with a pure irradiation with high doses, dosed even higher than 250 kGy. In particular with a mixture of the at least one thermoplastic elastomer with triallyl isocyanurate in a quantity of approx. 1.75% to approx. 2.5% by weight, runtimes corresponding to or higher than those as such with twice the triallyl isocyanurate can be achieved with an irradiation dose, preferably in a range of approx. 180 kGy, more preferably 190 kGy to approx. 260 kGy, more preferably in a range of approx. 190 kGy to approx. 220 kGy, and more preferably in a range of approx. 190 kGy to approx. 210 kGy. In particular, the runtimes in comparison to identical amounts of triallyl isocyanurate in the mixture comprising at least one thermoplastic elastomer are higher by approx. 30% to approx. 400%, sometimes up to 800%, than with bellows that have been produced without irradiation, or with radiation doses of less than 140 kGy. It is surprising that in a relatively narrow range of the amount of triallyl isocyanurate that is added in conjunction with a relatively narrow range for the dose of ionizing radiation, these advantageous long runtimes can be obtained at temperatures higher than 140° C. The bellows is entirely exposed to the ionizing radiation in this example. In another example, only the pleated region of the bellows is exposed to the ionizing radiation, but not the two collars adjoining the pleated region, used for attaching the bellows.

Bellows, as set forth herein, are preferably arch bellows and pleated bellows. The fundamental structure thereof in conjunction with the explanations of the prior art have already been described. It is particularly preferred that arch bellows, as set forth herein, have external reinforcement ribs located between the first, larger collar region and the bellows in the form of a half-torus. These, preferably eight such reinforcing ribs, more preferably at least 12, and even more preferably at least 16 such reinforcing ribs, encompass the arch bellows, basically perpendicular to a central axis thereof. The first, larger collar region and the second, smaller collar region can have different designs. In particular, they can be adapted to the connection on the component. As such, the first and second collar regions can contain at least one circumferential recess in the form of an annular groove in the region of a respective binder seat on their undersurfaces facing a component, which accommodates a corresponding annular bead on an outer surface of the component. In particular, a binder seat region in the first, larger collar region can end before an end of a component, or it can extend over and end of the component. In another preferred embodiment, there can be internal reinforcement ribs in addition to or alternatively to the external reinforcement, which at least partially engage in the inner surface of the half-torus shaped bellows, starting from a transition region between the first, larger collar region and the half-torus shaped bellows, which can be referred to as the pleated region of an arch bellows. Arch bellows that have internal or external reinforcement ribs are known, e.g. from WO 2009/155956 A1, the disclosure of which is hereby included in the subject matter of the present invention with regard to the design of the internal and external reinforcement ribs. The first binder seat region for a binder in the first, larger collar region and the second binder seat region for a binder in the second, smaller collar region can also have boundaries in the form of circumferential walls, ear-shaped projections, etc., for preventing the binder from slipping off. The binder can be in the form, e.g., of a compression strap (or hose clamp), etc.

In a similar manner to that described above in conjunction with arch bellows, the first, normally larger collar region and the second, smaller collar region in an accordion bellows are designed as set forth herein. The accordion bellows preferably has a conical bellows region, tapering from the first, larger collar region to the second, smaller collar region, in the form of a pleated region. There can also be accordion bellows that have collar regions of equal diameters, such that the bellows region, or pleated region, is not tapered between the collars, but instead is basically cylindrical. The bellows region, or pleated region in an accordion bellows as set forth herein can have a variety of designs. In particular, the bellows region can contain at least two pleats, preferably at least four pleats, more preferably at least 6 or more pleats, with troughs and peaks between them. One or more of the pleats, e.g. three or four pleats, can also have the same internal diameter, measured at the peaks, such that the otherwise conical pleated region is actually cylindrical, at least in part. Such a cylindrical section of a pleated region is preferably oriented toward the second, smaller collar region, or borders it directly. It may also be the case that there is a circumferential rib in the troughs, separating a conical part of the pleated region from a cylindrical part of a pleated region.

It is particularly preferred, as set forth herein, that an arch bellows or an accordion bellows can be designed to be placed on a joint housing, wherein the joint housing can also have a tri-lobed outer contour. In this case, the first collar region of the arch bellows, or the accordion bellows, can be designed such that it follows the outer contour of such a tri-lobed joint housing, while also providing a radially circumferential binder seat for a binder. Alternatively, adapters can be used, such that the first collar region of the arch bellows or accordion bellows can have a circular cross section. It is particularly preferred that an accordion bellows as set forth herein is suitable for use with a universal joint. An arch bellows as set forth herein is particularly preferably suitable for and used with joints that reach high rotational rates, in particular swivel joints that are not bent to a greater extent.

Insofar as the terms "approx." (approsimately) or "substantially" are used herein in conjunction with values, ranges of values, or terms referring to values, the person skilled in the art will understand them to mean what would be considered typical in the given context. In particular, the deviations in the given values, ranges of values, or terms referring to values comprises deviations of ±10%, preferably ±5%, more preferably ±2% form the terms "approx." or "substantially." Insofar as various ranges are given for amounts in reference to components and definitions, e.g. physical-chemical properties, for mixtures and their components that can be used in the disclosed method, the upper and lower limits for the various ranges can be combined with one another with respect to the respective component and the respective definition. Thermoplastic elastomers as set forth herein are thermoplastic copolyesters with hard segments and soft segments, which can also be referred to as thermoplastic block copolyesters. The hard segments and the soft segments are distinctly separated in the molecules. At a certain temperature, these thermoplastic elastomers separate into a continuous phase and a discontinuous phase, wherein below the glass transition temperature $T_g$ of the discontinuous phase, this functions as the cross-linking point. Those thermoplastic block-copolyesters that have a hardness in a range of approx. 25 shore D to approx. 75 shore D are particularly preferred for the present invention. Those thermoplastic copolyesters that have an average molar mass $M_w$ ranging from approx. 80,000 to approx. 200,000, more preferably in a range of approx. 100,000 to approx. 150,000 are also preferred. The thermoplastic block-copolyesters particularly preferably have a tensile strength in accordance with ASTM D638 in the version that is valid at the time of the patent application for the present invention, in a range of approx. 10 MPa to approx. 50 MPa, more preferably in a range of approx. 15 MPa to approx. 40 MPa. Thermoplastics are not comprised in the mixture, because these do not exhibit the necessary elastomer properties in the processed state for a bellows, in particular an accordion bellows or an arch bellows, in particular necessary for automobiles, and do not satisfy the requirements for them.

The soft segment of the at least one thermoplastic elastomer particularly preferably comprises, as set forth herein, units of two to eight carbon atoms, preferably units of three to six carbon atoms, in particular repeating units of this type. The soft segment of the at least one thermoplastic elastomer is particularly preferably a polyether, obtained from alkylene oxides with two to eight carbon atoms, preferably three to six carbon atoms. The soft segment is particularly preferably formed from polytetrahydrofuran units, preferably at least one such polytetrahydrofuran unit, preferably at least two, preferably at least four such units. The units with two to eight carbon atoms are also preferably bonded to a terephthalate unit in the soft segment. The polytetrahydrofuran can also be referred to as poly(tetramethylene ether) glycol, or poly(tetramethylene oxide).

As set forth herein, the hard segment of the at least one thermoplastic elastomer ether is preferably selected from the group comprising polybutylene terephthalate and polyethylene terephthalate, and is particularly preferably polybutylene terephthalate. As set forth herein, the at least one thermoplastic elastomer is particularly preferably formed from hard segments of polybutylene terephthalate, and soft segments of polymethylene oxide with a terephthalate unit, wherein the soft segment can also be referred to as poly (tetramethylene ether) glycol terephthalate. As set forth herein, the mixture from which the bellows is produced particularly preferably comprises exactly one thermoplastic elastomer, particularly preferably that specified above.

The mixture for producing the bellows can also comprise other components, in addition to the at least one, preferably exactly one, thermoplastic elastomer, particularly preferably such a one as described above, and the triallyl isocyanurate serving as the chemical and/or thermal cross-linking agent. These additives are selected from a group comprising dyes, including carbon black, stabilizers, in particular for the temperature sensitive triallyl isocyanurate, processing agents, modifiers, antioxidants, and/or catalysts. The mixture is particularly preferably composed of exclusively at least one, more preferably exactly one, thermoplastic elastomer, in particular such a one as describe above, and triallyl isocyanurate. Mixtures of numerous thermoplastic elastomers are preferably avoided, because this can result in irregular material properties, or may reduce the strength value in particular.

The production of the mixture in the first step takes place, e.g., using a tumbler. The at least one thermoplastic elastomer and the triallyl isocyanurate are preferably in a granulate, such that they can be readily mixed in conventional commercial mixers, e.g. a tumbler, to obtain a homogenous mixture. The triallyl isocyanurate is preferably added to the mixture during the compounding process, i.e. the thermoplastic elastomer is first placed in the mixer, and the triallyl isocyanurate and any other additives, such as carbon black, or stabilizers, the later in smaller amounts, are then added thereto. At least the triallyl isocyanurate and any additives can also be added during a polymerization of the starting materials forming the hard and soft segments of the thermoplastic elastomers, such that in some circumstances, there is no need for a subsequent compounding step. Just a portion of the triallyl isocyanurate and/or the additives can also be added during the polymerization step, and the rest of the triallyl isocyanurate and/or additives can be added subsequently in a compounding step. Preferably, at least a portion of the triallyl isocyanurate is added to the at least one, preferably exactly one, thermoplastic elastomer during its polymerization. It is also possible for just all of the additives, or just all of the triallyl isocyanurate to be added during the polymerization step, and either all of the additives or all of the triallyl isocyanurate are then added during the compounding step. The term "additive" as it is used presently comprises one or more of the components specified above. Particularly preferably, a pre-mixture composed of at least one thermoplastic elastomer, more preferably exactly one thermoplastic elastomer, and triallyl isocyanurate is produced. Such a pre-mixture comprises approx. 10% to approx. 50% triallyl isocyanurate by weight with respect to the overall quantity of the pre-mixture, and approx. 50% to approx. 90% of the at least one thermoplastic elastomer, preferably exactly one thermoplastic elastomer, more precisely a thermoplastic block-copolyester, as described above, likewise by weight with respect to the overall quantity of the pre-mixture. The pre-mixture can be produced, e.g. in a tumbler, to obtain a homogenous mixture, wherein this can also be carried out at higher temperatures than the normal room temperature of 25° C. The at least one thermoplastic elastomer is subsequently added to this pre-mixture to obtain the overall mixture. It is particularly preferred that the at least one thermoplastic elastomer and the at least one thermoplastic elastomer used for producing the pre-mixture are identical, such that preferably exactly one thermoplastic elastomer, more preferably exactly one thermoplastic block-copolyester, is used, which is identical in the pre-mixture and during the creation of the mixture for producing the bellows.

Triallyl isocyanurate, also referred to as triallyl-s-triazine t-2,4,6(1H,3H,5H)-trion, is a tri-functional polymerizable monomer, which serves as a cross-linking component for the at least one thermoplastic elastomer in the mixture for producing the bellows in the disclosed method. Various production methods for triallyl isocyanurate are described in DE 10 2006 032 167 B4.

Production of the bellows in the second step of the disclosed method preferably takes place using a pressure blower injection blowing process, an extrusion process, an injection molding process, a transfer molding process, and/or an extrusion blowing process. The production using injection molding is particularly preferred, particularly when the bellows that is to be produced is an arch bellows. The production of the bellows in the second step preferably takes place as set forth herein at a temperature ranging from approx. 170° C. to approx. 250° C., more preferably at a temperature ranging from approx. 200° C. to approx. 250° C. If a single or double screw extruder is used for producing a bellows in an injection molding process, the temperature of the mixture in the extruder is advantageously increased toward the discharge valve, and the temperature of the discharge is preferably in a range of approx. 230° C. to approx. 250° C. If an accordion bellows is produced using the disclosed method, it is preferably produced in a pressure blower injection blowing process, wherein the processing temperatures for the mixture correspond to those specified above in conjunction with the injection molding process for producing arch bellows.

The exposure to at least one ionizing beam with an energy in the range of approx. 5 MeV to approx. 15 MeV, more preferably in a range of approx. 6 MeV to approx. 12 MeV takes place in the third step. It has been shown to be the case that a sufficient cross-linking takes place with such an energy input in a relatively short time interval, such that the bellows can be reasonably produced with the disclosed method on an industrial scale.

The exposure particularly preferably takes place in the third step with at least one ionizing beam in incremental radiation doses of approx. 20 kGy to approx. 40 kGy, more preferably with radiation doses in a range of approx. 25 kGy o approx. 36 kGy. The exposure takes place until a radiation dose in a range of approx. 140 kGy to approx. 350 kGy, preferably in a range of approx. 190 kGy to approx. 260 kGy, more preferably in a range of approx. 150 kGy to approx. 250 kGy, more preferably in a range of approx. 220 kGy to 280 kGy, and in a range of approx. 160 kGy to approx. 220 kGy has been reached. With irradiation at these radiation doses, it has advantageously been shown that the produced bellows can reach sufficiently high runtimes, in particular more than 100 hours, at increased temperatures of, e.g., 150° C. which satisfy the requirements for modern joint constructions. Using lower radiation doses than the overall radiation doses specified above normally does not result in runtimes of more than 100 hours at temperatures of approx. 150° C. The incremental exposure with radiation doses as set forth herein has the advantage that a nearly uniform cross-linking of the produced bellows can take place, such that material differences do not play a role, and therefore, high service lives, in particular high runtimes of the bellows produced in this manner can be obtained.

Electron beams are preferably used as the ionizing radiation. Other radiation sources such as X-rays, γ-rays, α-rays, or short wave ultraviolet radiation can also be used.

There are advantageously pauses between the individual increments in which the radiation dose is increased, ranging from approx. 1 second to approx. 60 minutes, or even longer. It is preferably possible to work, e.g., with an electron beam device that uses more than one electron beam, in particular one that irradiates the finished bellows from all sides simultaneously, or from above at different angles. Such a device can emit, e.g., four or eight, or more, electron beams. When numerous electron beams are used, the values specified above for the overall dose as well as for the incremental approach to the exposure applies collectively to all of the electron beams.

Based on GPC measurements, it has been determined that through the exposure to at least one electron beam in the third step of the disclosed method, a cross-linking of the at least one thermoplastic elastomer takes place. A higher energy dose results in a greater cross-linking, i.e. the extent of cross-linking is greater. The bellows produced by means of the disclosed method exhibit sufficient hardness for use in particular in automotive engineering for drive shafts, wherein, in comparison with bellows that are not irradiated in accordance with the third step, the fusion enthalpy determined through DSC (differential scanning calorimetrics) is reduced for a finished arch bellows that has a triallyl isocyanurate content of approx. 1.5% to approx. 4% by weight with respect to the overall quantity of the mixture that is used. With a radiation dose of 100 kGy, it is at approx. 20.4 J/g for 2.25% triallyl isocyanurate by weight, and at 150 kGy, it is approx. 17.8 J/g, and at 200 kGy, it is at approx. 17.4 J/g. The melting temperature is only slightly reduced in comparison with the bellows that have not be irradiated with electrons, such that the bellows produced according to the invention fulfill requirements for increased temperatures during use. The electron irradiated bellows have, like those that have not been irradiated, a melting range, and exhibit elastomer properties. A conversion to thermosetting plastics does not occur. The method is conducted such that the irradiated bellows still has elastomer properties. The average tensile strength, determined in accordance with ISO 32:2011, for the bellows produced according to the invention lies in a range of approx. 37 mPa to approx. 40 mPa.

In a particularly preferred embodiment of the disclosed method for producing a bellows from a mixture, at least one, preferably exactly one, thermoplastic elastomer is used, selected from the group of copolyesters that have a hard segment and a soft segment, wherein the soft segment is preferably formed from polytetrahydrofuran units, preferably at least one such polytetrahydrofuran unit, preferably at least two, preferably at least four such units, and wherein the hard segment is selected from a group composed of polybutylene terephthalate and polyethylene terephthalate, wherein the at least one thermoplastic elastomer is mixed in a first step with approx. 1.85% to approx. 2.6% triallyl isocyanurate by weight with respect to the overall amount of the mixture; in a second step, the bellows is produced; and in the third step, the entire bellows, is exposed to an ionizing beam in a dose ranging from approx. 190 kGy to approx. 260 kGy, preferably ranging from approx. 220 kGy to 280 kGy, wherein the exposure takes place with ionizing radiation in increments, preferably in radiation doses of approx. 20 kGy to approx. 40 kGy.

The present disclosure also relates to a bellows, in particular an accordion bellows or an arch bellows, particularly preferably an arch bellows, produced in accordance with the disclosed method. The arch bellows is preferably formed in the manner described above, and has, in particular, outer reinforcement ribs. The bellows according to the invention has the advantageous properties described above, and can withstand runtimes of more than 100 hours at temperatures of approx. 150° C., and therefore displays properties when loaded that are significantly improved in comparison with the accordion bellows known from the prior art. The reason for this can be attributed to the different type of cross-linking, which takes place during the production of the bellows in the second step through the triallyl isocyanurate that has been added, and is continued through the exposure to ionizing radiation in the third step, preferably electron beams.

BRIEF DESCRIPTION OF THE DRAWINGS

The present invention shall be explained in greater detail based on the following examples. Therein.

DESCRIPTION

First, a typical arch bellows with outer reinforcement ribs was produced for attaching to a joint housing at one end and a shaft at the other, from a mixture of a thermoplastic block-copolyester with polybutylene terephthalate as the hard segments and polytetrahydrofuran terephthalate as the soft segments.

First, a pre-mixture was produced from 15% triallyl isocyanurate and 85% of the thermoplastic block-copolyester described above, by weight with respect to overall quantity of the pre-mixture. From this, mixtures were then produced with a triallyl isocyanurate content of 0%, 1.5%, 2.25%, 3%, 3.75% and 4.5%, by weight in each case with respect to the overall quantity of the mixture used for producing the bellows, and the arch bellows was produced in an injection molding process, e.g. using a screw extruder. The discharge temperature at the nozzle of the screw extruder was 245° C.

Subsequently an electron irradiation took place with an electron beam device that has eight electron beams evenly directed at the entire outer surface of the arch bellows from above to ensure a uniform energy input. The energy input took place at 10 MeV in radiation doses of approx. 33 kGy, until overall radiation doses of 100 kGy, 150 kGy, and 200 kGy were reached. The arch bellows produced in this manner were then tested under operating conditions to determine their runtime. The runtime was determined at an angle of 7°, a temperature of 150° C., and a rotational rate of 4,800 rpm. The bellows produced according to the present disclosure were then mounted on a universal joint and filled with grease. With the occurrence of grease loss, or if it has been determined that there are other signs of material fatigue, in particular formation of creases or pleats, the test is aborted. There was a break-in period of approx. 30 minutes at 1,000 rpm, and the rotational rate was subsequently increased linearly to 4,800 rpm. Two bellows with a specific composition were tested at a time.

Figure 1:
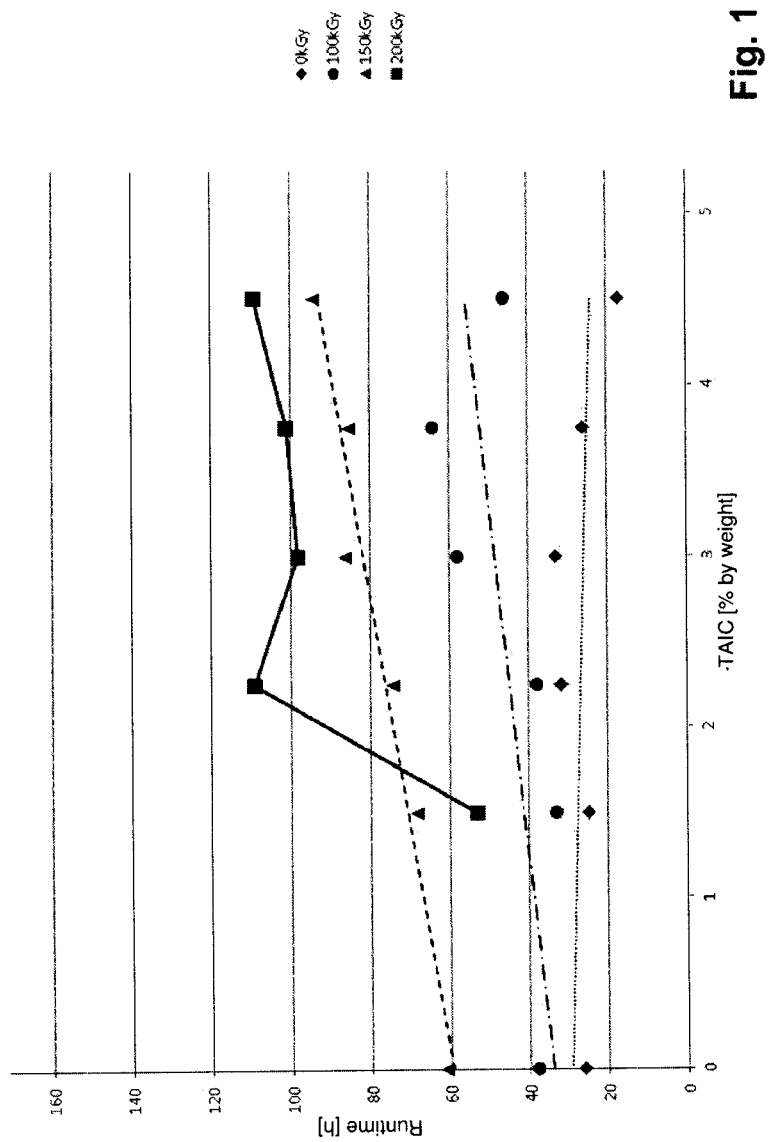
FIG. 1: shows a measurement of the runtime as a function of the amount of triallyl isocyanurate that is used with different electron beam doses.

It can be derived from FIG. 1 that with irradiation of up to 150 kGy, a relatively linear and anticipated behavior could be observed with regard to the increase in the radiation dose, as well as the increase in triallyl isocyanurate, wherein a runtime of more than 100 hours was never reached. With a radiation dose of 200 kGy, the graph of which is not presented in FIG. 1 for purposes of clarity, unlike the graphs for radiation doses of 0 kGy, 100 kGy, and 150 kGy, the runtime was initially surprisingly lower at a quantity of 1.5% triallyl isocyanurate by weight than with an energy dose of 150 kGy. A significant increase in the runtime was obtained within a relatively narrow range. This range comprises approx. 1.85% to approx. 2.7% triallyl isocyanurate by weight. Significantly higher runtimes were obtained in this relatively narrow range with a comparatively low amount of triallyl isocyanurate than in cases with energy doses of 200 kGy and significantly higher triallyl isocyanurate levels, in particular more than 3% by weight. As such, the test surprisingly showed that when relatively high electron beam doses are used, triallyl isocyanurate is extremely effective in a relatively low and narrow, limited range with regard to a significant increase in the runtime of the tested arch bellows.

Figure 2:
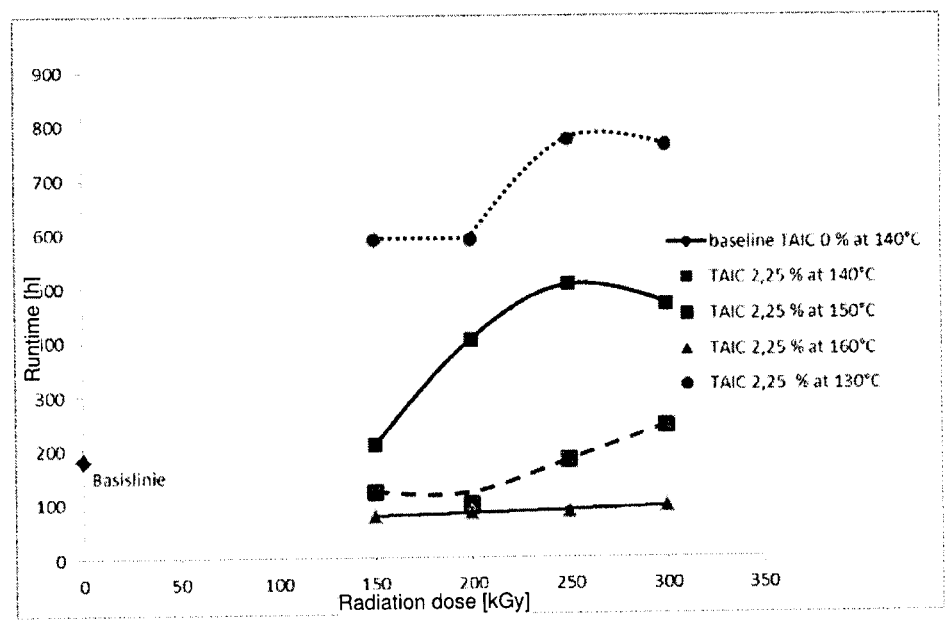
FIG. 2: shows a measurement of the runtime as a function of the radiation dose at different temperatures.

In another example the same procedure from the aforementioned example was used, in which a mixture of the thermoplastic polymer described above with only 2.25% triallyl isocyanurate by weight was tested in comparison to a comparison example without any triallyl isocyanurate. In differing from the above example, a bending of 3° and a rotational rate of 6,000 rpm was used. The runtime was determined as described above at various temperatures and radiation doses of up to 300 kGy. FIG. 2 shows the results of this example. In particular, in a range of approx. 220 kGy to approx. 280 kGy, high runtimes of up to nearly 800 hours could be obtained at 130° C. and 140° C. But even at higher temperatures of 150° C. with radiation doses starting at approx. 250 kGy, there was an improvement over a baseline without triallyl isocyanurate.

Both a method and a bellows are made available with the present invention, by means of which suitable properties with regard to the stability of the bellows as well as a sufficiently increased service life are obtained at high temperatures of 120° C. and higher, which occur in modern joint constructions, in particular with regard to the electric mobilization of automobiles.

The invention claimed is:

1. A method for producing a bellows from a mixture comprising at least one thermoplastic elastomer selected from a group of copolyesters that have a hard segment and a soft segment, the method comprising:
   mixing the at least one thermoplastic elastomer with 0.8% to 5% triallyl isocyanurate with respect to the overall weight of the mixture;
   producing the bellows; and
   exposing the bellows to ionizing radiation in a range of 140 kGy to 350 kGy, wherein the bellows after the exposure is thermoplastic.

2. The method of claim 1, wherein the soft segment of the at least one thermoplastic elastomer comprises units of 2 to 8 carbon atoms.

3. The method of claim 1, wherein the soft segment is a polyether obtained from alkylene oxides with 2 to 8 carbon atoms.

4. The method of claim 1, wherein the hard segment is polybutylene terephthalate or polyethylene terephthalate.

5. The method of claim 1, wherein one and only one thermoplastic elastomer is used.

6. The method of claim 1, wherein the production of the bellows is by one or more of a pressure blower-injection blowing process, extrusion process, injection molding process, transfer molding process, or an extrusion blowing process.

7. The method of claim 1, wherein the production of the bellows takes place at a temperature in the range of 170° C. to 250° C.

8. The method of claim 1, wherein the exposure to ionizing radiation takes place with at least one ionizing beam with an energy in the range of 5 MeV to 15 MeV.

9. The method of claim 1, wherein the exposure to ionizing radiation takes place incrementally with at least one ionizing beam in radiation doses ranging from 20 kGy to 40 kGy.

10. A bellows, made from a mixture comprising at least one thermoplastic elastomer selected from a group of copolyesters that have a hard segment and a soft segment, the bellows being made by:
    mixing the at least one thermoplastic elastomer with 0.8% to 5% triallyl isocyanurate with respect to the overall weight of the mixture;
    producing the bellows; and
    exposing the bellows to ionizing radiation in a range of 140 kGy to 350 kGy, wherein the bellows after the exposure is thermoplastic.

11. The bellows of claim 10, wherein the soft segment of the at least one thermoplastic elastomer comprises units of 2 to 8 carbon atoms.

12. The bellows of claim 10, wherein the soft segment is a polyether obtained from alkylene oxides with 2 to 8 carbon atoms.

13. The bellows of claim 10, wherein the hard segment is polybutylene terephthalate or polyethylene terephthalate.

14. The bellows of claim 10, wherein one and only one thermoplastic elastomer is used.

15. The bellows of claim 10, wherein the production of the bellows is by one or more of a pressure blower-injection blowing process, extrusion process, injection molding process, transfer molding process, or an extrusion blowing process.

16. The bellows of claim 10, wherein the production of the bellows takes place at a temperature in the range of 170° C. to 250° C.

17. The bellows of claim 10, wherein the exposure to ionizing radiation takes place with at least one ionizing beam with an energy in the range of 5 MeV to 15 MeV.

18. The bellows of claim 10, wherein the exposure to ionizing radiation takes place incrementally with at least one ionizing beam in radiation doses ranging from 20 kGy to 40 kGy.

* * * * *